June 4, 1957 E. J. RAPP 2,794,404
ICE CREAM SANDWICH MACHINE
Filed Aug. 5, 1953 4 Sheets-Sheet 1
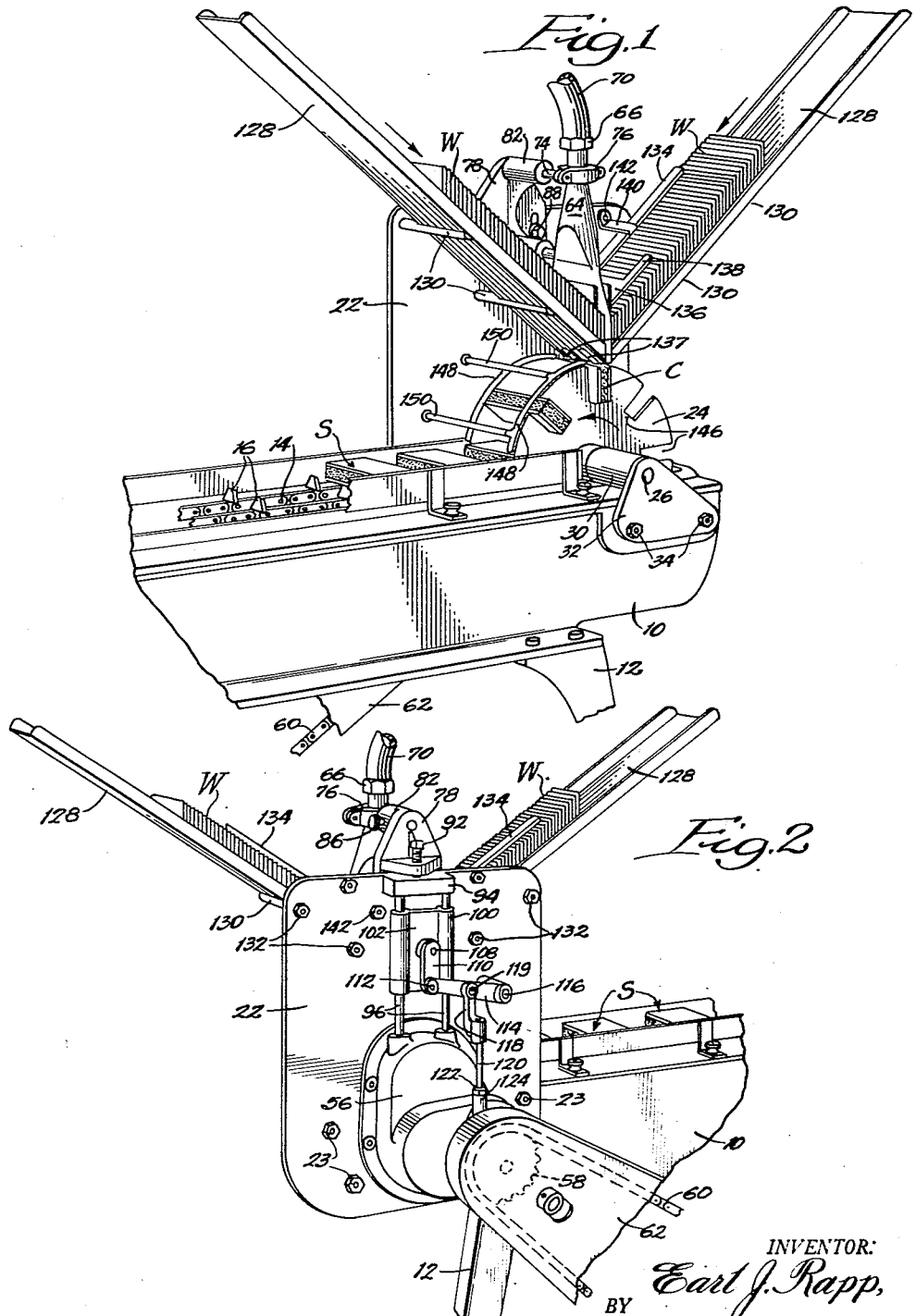
INVENTOR:
Earl J. Rapp,
BY
Bair, Freeman & Molinare
ATTORNEYS.

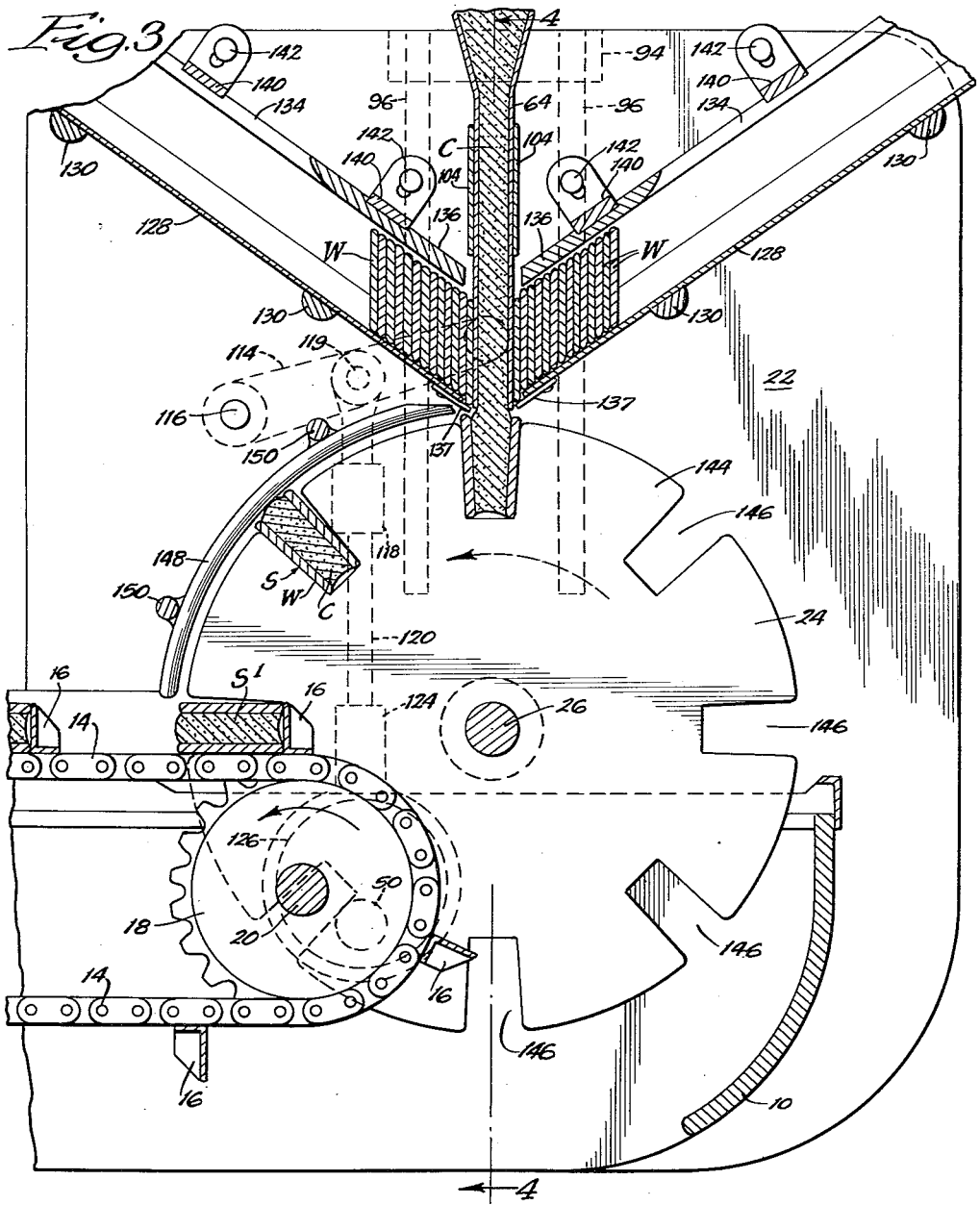

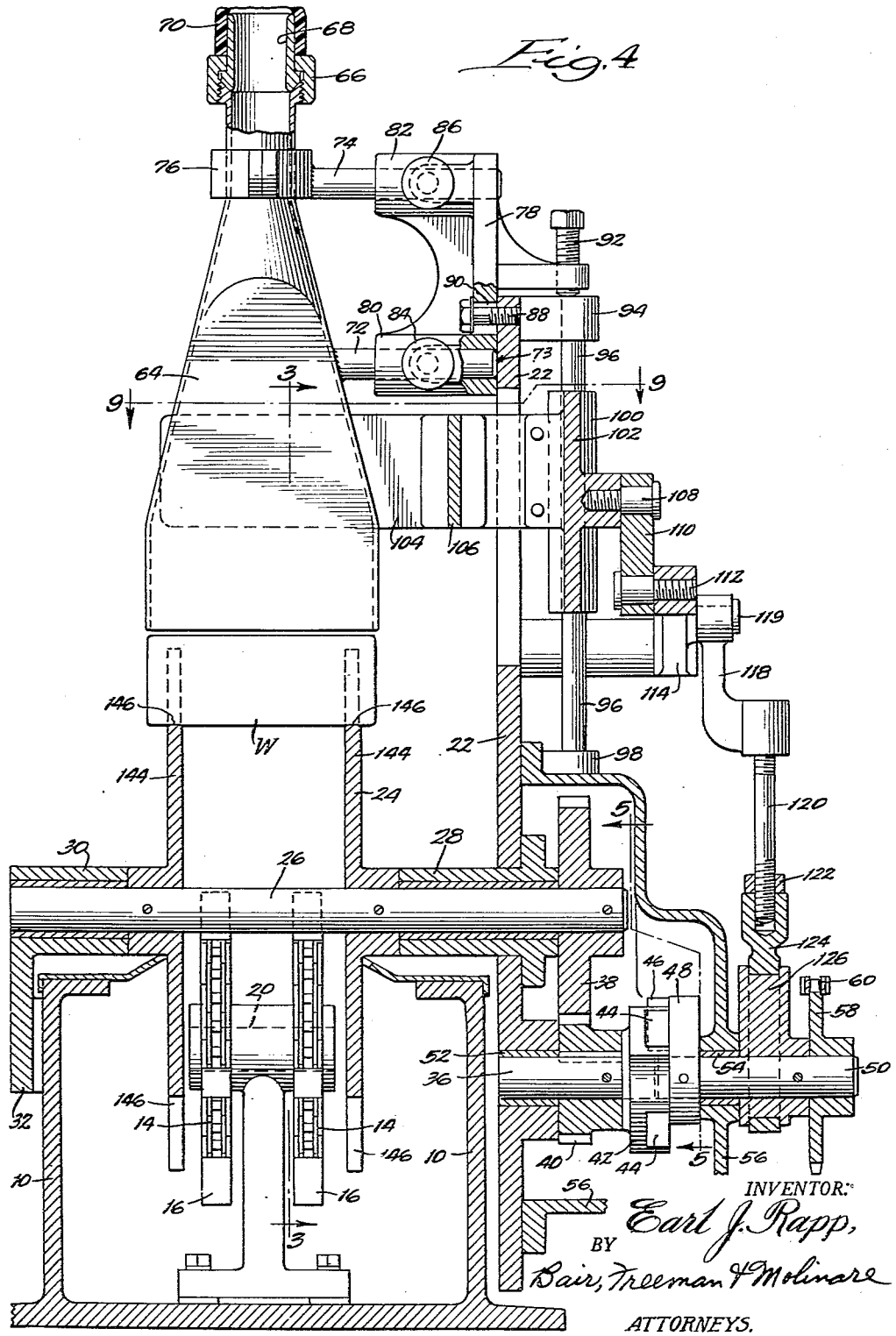

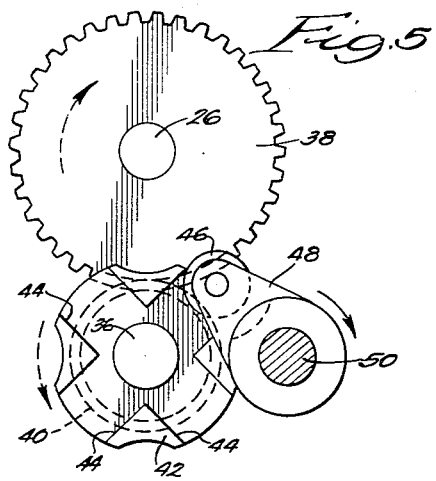
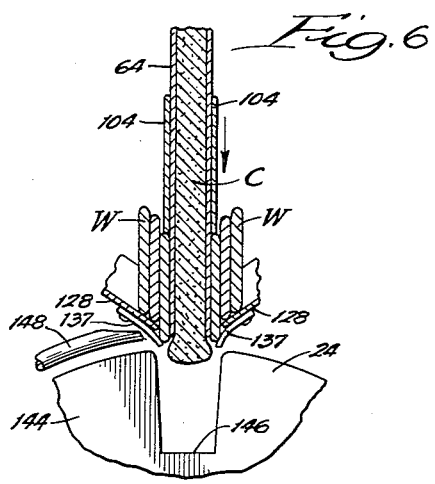
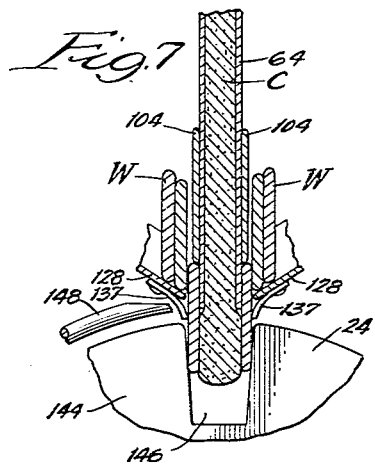
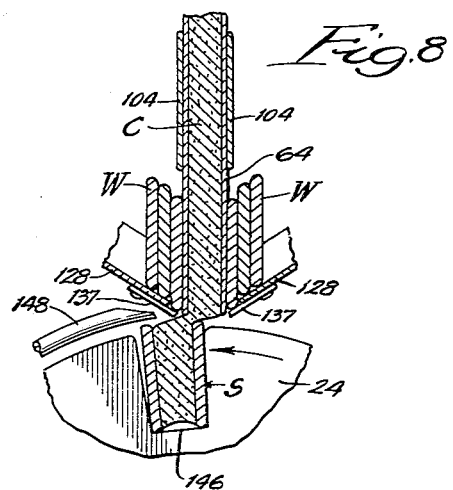
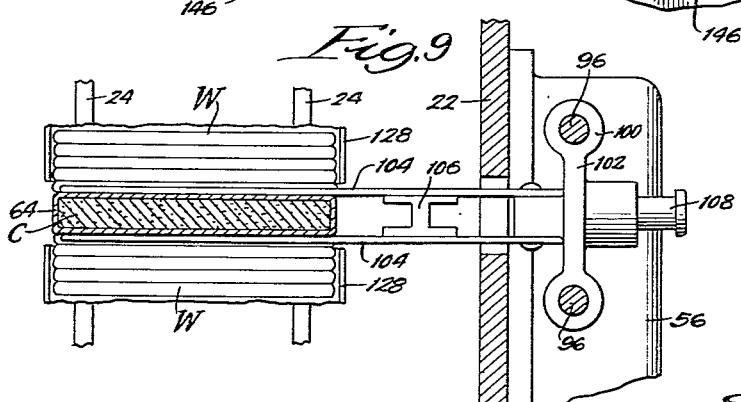

United States Patent Office 2,794,404
Patented June 4, 1957

2,794,404

ICE CREAM SANDWICH MACHINE

Earl Joseph Rapp, Toledo, Ohio, assignor to Lynch Corporation, Anderson, Ind., a corporation of Indiana Application August 5, 1953, Serial No. 372,559

6 Claims. (Cl. 107—1)

This invention relates to an ice cream sandwich machine and particularly one which is of comparatively simple and inexpensive construction, involves a minimum of operating parts, yet efficiently makes ice cream sandwiches from ice cream being continuously extruded from a nozzle and from stacks of wafers from which two wafers at a time are extracted and placed on opposite sides of the ice cream.

A primary object of this invention is to provide a machine of this general character which can quickly form ice cream sandwiches at a rate that is comparable to that attained in wrapping machines for butter and the like so that the formed ice cream sandwiches can be directly delivered to a wrapping machine of this character and from which the wrapped ice cream sandwiches may be discharged, cartoned and then placed in an ice cream freezer for hardening and preparatory to subsequent distribution, the entire operation being automatic with the exception of the necessity of keeping a pair of chutes of the machine filled with wafers.

Another object is to provide in an ice cream sandwich making machine in which an ice cream extruding nozzle is mounted in opposition to a sandwich receptor and wafers are fed against opposite sides of the nozzle, wafer engaging blades being provided to move the wafers to a position beyond the discharge end of the nozzle to contact the ice cream being extruded therefrom and thus form a sandwich, a sandwich receptor which is intermittently movable and when it does move effects a shearing action on the ice cream with respect to the nozzle so as to complete the ice cream sandwich unit, ready for delivery to a conveyor, which in turn delivers it to a wrapping mechanism of a wrapping machine.

A further object is to provide actuating mechanism for the sandwich receptor and for the wafer engaging blades so that they are properly timed and coordinated with a continuous rate of extrusion of the ice cream from the nozzle to efficiently form the sandwiches by the combination of this extrusion and the movement of the wafers into the pockets of the sandwich receptor, the completion of the sandwich being merely the shearing off of the ice cream by the movement of the sandwich receptor.

Still a further object is to provide a sandwich receptor consisting of a pair of discs with notches therein, the notches being tapered in such manner as to cooperate in the proper coaction of the continuously extruded ice cream and the intermittently moved wafers in properly forming the sandwiches.

An additional object is to provide a method of making ice cream sandwiches which involves the steps of extruding ice cream from a nozzle at a substantially constant rate and intermittently moving wafers in the direction of extrusion and at a higher rate into a receptor pocket with the advance edge of the ice cream and the advance edges of the wafers substantially coincident when the two are completely in the pocket, and then moving the sandwich of wafers and ice cream between them laterally in respect to the direction of initial ice cream movement for shearing off the ice cream substantially at the discharge end of the nozzle.

With these and other objects in view my invention consists in the construction, arrangement and combination of the various parts of my ice cream sandwich machine and in the steps of my method whereby the objects contemplated are attained, as hereinafter more fully set forth, pointed out in my claims and illustrated in the accompanying drawings, wherein:

Figure 1 is a perspective view of an ice cream sandwich machine embodying my present invention and showing it mounted on the intake end of a wrapping machine, a portion of the wrapping machine conveyor being shown for removing the ice cream sandwiches from my machine and delivering them to the wrapping mechanism of the wrapping machine.

Figure 2 is another perspective view of the ice cream sandwich making machine, as seen from the opposite side of the view shown in Figure 1.

Figure 3 is an enlarged central vertical sectional view through the rotor that forms the sandwich receptor and through the associated parts of the machine, and shows it in operation, a sandwich having been completely received in a pocket of the receptor.

Figure 4 is a vertical sectional view on the line 4—4 of Figure 3 and shows the various operating mechanisms of the machine.

Figure 5 is a detailed vertical sectional view on the line 5—5 of Figure 4 to show the intermittent drive for the sandwich receptor.

Figure 6 is a diagrammatic view somewhat similar to Figure 3 showing the operation just as the wafers are beginning to move downwardly into a pocket of the receptor.

Figure 7 is a view similar to Figure 6 but enlarged thereover to show a further step in the operation, the sandwich being about half way between the initial and final positions thereof and after which the parts assume the position shown in Figure 3.

Figure 8 is a similar diagrammatic view showing the positions of the parts following Figure 3 and the ice cream of the sandwich being sheared off across the discharge end of the nozzle; and Figure 9 is a horizontal sectional view on the line 9—9 of Figure 4 to show the wafer propelling mechanism and its relation to the nozzle and other parts of the machine.

On the accompanying drawings I have used the reference numeral 10 to indicate the frame of a wrapping machine which may be supported by suitable legs such as shown at 12. This machine includes a pair of intake conveyor chains 14 on which spaced lugs 16 are mounted and the chains extend over a pair of sprockets 18 mounted on a shaft 20. The shaft 20 is driven continuously for moving ice cream sandwiches indicated at S to a wrapping position where wrapping mechanism wraps them and discharges them from the wrapping machine. Since this mechanism forms no part of my present invention it has not been illustrated.

My ice cream sandwich machine is in the form of an attachment for the wrapping machine thus far described and consists of a suitable frame plate 22 attached to the wrapping machine frame 10 as by bolts 23 (see Figure 2) and supporting the mechanism of the sandwich machine. This mechanism will now be described.

A sandwich receptor is provided in the form of a pair of discs 24 secured to a shaft 26 which is journaled in a bearing 28 and a bearing 30. The bearing 28 is secured to the frame plate 22 and the bearing 30 is provided with a flange 32 bolted to the frame 10 as at 34 (see Figure 1).

The shaft 26 is driven from a shaft 36 by means of a gear 38 secured to 26 and a pinion 40 meshing therewith and secured to 36. A Geneva disc 42 is secured to the shaft 36 to which the pinion 40 is also secured. The disc 42 is provided with slots 44. A rotator roller 46 is adapted to coact with the slots 44, this roller being carried by a rotator arm 48 of the Geneva movement secured to a constantly rotating shaft 50. The shaft 50 is journaled in a bearing 54 and the shaft 36 is journaled in a bearing 52, the two terminating within the Geneva disc 42 as shown in Figure 4 by means of dotted lines.

The shaft 50 is rotated once each cycle of operation of the wrapping machine by means of a sprocket 58 and a chain 60, the chain extending to a suitable shaft of the wrapping machine (not shown) which is rotated once per cycle, and thus my sandwich making machine is in timed relation to the continuously operable intake conveyor 14. A housing 62 is shown to cover the chain 60.

An ice cream extruding nozzle 64 is supported on the frame plate 22 as will hereinafter be described and is connected by a union 66 and a nipple 68 to a transparent flexible plastic tube 70 into which plastic but form sustaining ice cream is supplied under pressure from the ice cream making apparatus. The ice cream is indicated generally at C and is adapted to be extruded between wafers W to form the ice cream sandwiches S.

A lower rod 72 is welded to the nozzle 64 and an upper rod 74 is welded to a collar 76 surrounding the neck of the nozzle and extending toward a bracket 78. This bracket has hubs 80 and 82 receiving the rods 72 and 74 respectively and set screws 84 and 86 are provided for retaining the rods in the hubs. The heads of the set screws are knurled for quick adjustment for a purpose which will hereinafter appear. A surface of the plate 22 indicated at 73 acts as a definite stop for the rod 72 in order to locate the nozzle 64 accurately centered in relation to the sandwich receptor discs 24.

The bracket 78 is secured to the frame plate 22 by means of a pair of clamp screws 88 passing through slots 90 of the bracket and threaded into the plate. These slots permit vertical adjustment of the nozzle and a lifting screw 92 is provided for coaction with a guide rod support 94 for lifting the bracket 78 or lowering it when the screws 88 are loosened for adjustment purposes. After the adjustment is completed then of course the screws 88 are clamped tight.

A pair of guide rods 96 have their upper ends fixed in the support 94 and their lower ends fixed in hubs 98 of the gear housing 56. Sleeve portions 100 of a slide 102 are slidable vertically on the guide rods 96 and carry wafer propelling plates 104 located on opposite sides of the nozzle 64 as shown in Figure 9. A cross brace 106 is provided between the plates 104.

For reciprocating the slide 102 I provide a stud 108 projecting therefrom to which the upper end of a link 110 is pivoted. The lower end is pivoted to a stud 112 carried by the outer end of a lever 114 which is pivoted at 116 to the frame plate 22. Intermediate the ends of the lever 114 a link 118 is pivoted thereto on a stud 119 and an adjusting rod 120 is threaded into the link 118 and into an eccentric strap 124. A lock nut 122 is provided on the adjusting rod to lock the adjustment. The eccentric strap surrounds an eccentric 126 secured to the constantly rotating shaft 50.

A pair of inclined chutes 128 are provided and these are supported in spaced relation to the frame plate 22 by means of four rods 130 welded thereto and passing through the frame plate and provided with nuts 132. These chutes are for the purpose of containing stacks of the wafers W as shown in Figures 1, 2 and 3 with the inclination of the chutes tending to force the wafers by gravity against the opposite sides of the nozzle 64 as illustrated.

Wafer hold-down bars 134 are located above the wafers W and adjacent the nozzle these are widened as at 136 and provided with hold-down fingers 138. The elements 134—136—138 are supported by four brackets 140 bolted at 142 to the frame plate 22.

Pairs of resilient fingers 137 are provided below the wafers W adjacent the sides of the nozzle at the ejection end of the chutes 128. These fingers serve to support the lowermost wafer of each chute to prevent them from falling prior to their downward ejectment by plates 104.

The sandwich receptor discs 24 are provided with notches having sides 144 and bottoms 146. The sides 144 are slightly inclined so as to converge toward the center of rotation as shown in Figure 3. Sandwich hold-down rods 148 are supported by rods 150 extending from the frame plate 22 and these are arc-shaped to follow along the peripheries of the discs 24.

*Practical operation*

In the operation of my ice cream sandwich machine, stacks of wafers W are placed in the inclined chutes 128 and, due to gravity, will contact the opposite sides of the nozzle 64 as illustrated in Figure 3. The ice cream C is being constantly extruded under slight pressure due to the action of the ice cream making equipment and the extrusion of course is at a predetermined rate which may be varied somewhat depending upon various conditions.

Referring to Figure 6 the ice cream is being extruded from the discharge (lower) end of the nozzle 64 and the wafer propelling plates 104 have started to move down so that they engage the two wafers next to the nozzle and are pushing them past the lower ends of the chutes 128 and into the pocket of the ice cream sandwich receptor (notches 144—146 of the disc 24) which at this time are aligned with the nozzle.

When the wafers are about half-way down they slant outwardly slightly as shown in Figure 7 and since the ice cream is being constantly extruded whereas the wafers are lowered only intermittently the ice cream is a little ahead of the wafers. However, the speed of lowering of the wafers is faster than the extrusion of the ice cream so that by the time the wafers are completely in the notches 144—146 as shown in Figure 3 the ice cream is lagging slightly behind the wafers. This variation in relative speeds comes about by reason of the extrusion of the ice cream at a constant rate (which is desirable so that intermittent extrusion is unnecessary) and the periodic movement of successive wafers into the pockets of the ice cream sandwich receptor. Time must be given of course for the propeller plates 104 to move upwardly during each cycle of operation and it is thus necessary to move the wafers downwardly at a faster rate than the ice cream. By permitting the ice cream to move first as in Figure 6 and the wafers to move thereafter but at a greater speed, the timing of all parts of the machine is possible.

Finally when the sandwich receptor discs 24 start to rotate as in Figure 8, this movement will shear the ice cream off across the lower end of the nozzle 64 and complete the sandwich unit. During the sandwich making operation, the slight taper of the pockets 144—146 permits the wafer to slant out as in Figure 7 due to the expansion of the ice cream as it leaves the nozzle and its pressure becomes atmospheric and this provides a certain degree of looseness between the wafer surfaces and the ice cream to permit relative movement of the one relative to the other so as to permit the continuous feeding of the ice cream and the intermittent feeding of the wafers without undesirably deforming the sandwich.

The sandwich receptor discs 24 are indexed one-eighth revolution each cycle of operation so that after two cycles the sandwich arrives at the position S' where it can be engaged by the lugs 16 of the chains 14 and moved along the intake conveyor of the wrapping machine to the wrapping position. There they are wrapped and after leaving the wrapping machine are boxed and introduced into a freezer for solidifying the sandwiches and preparing them for subsequent storage and distribution to vending machines, consumers, etc.

As the discs 24 rotate the arc-shaped hold-down rods 148 retain the sandwiches in the slots of the disc and these rods terminate so as to clear the sandwich at position S' for being taken away by the conveyor 14.

As to the timing of the various elements of my ice cream sandwich machine in relation to the wrapping machine, the lugs 16 engage the sandwich at positions S' and move it out of the slots of the discs 24 while the discs are stationary. Also while they are stationary the blades 104 are moved downwardly. Right after the lower limit of their movement the discs are indexed to the next station and during the indexing period the plates 104 are moved upwardly while the discs are in motion.

As to the speed of the wrapping machine (and therefore the ice cream sandwich machine since the two are timed together) it is usual to provide in these wrapping machines an infinitely variable speed control and therefore the wrapping machine and the sandwich making machine can be accurately timed to the extrusion rate of the ice cream C whatever it may be. If it varies the speed control of the wrapping machine is correspondingly reset.

When it is desired to begin operation of the machine, the proper nozzle is selected and quickly connected to the machine by inserting the rods 72 and 74 in the hubs 80 and 82 and the set screws 84 and 86 then tightened and the union connection 66 made. Since the nozzle will unavoidably be relatively warm, the ice cream making apparatus is operated for a period of time to pass ice cream of the proper consistency out of the nozzle, into a suitable container for subsequent return to the apparatus, until the nozzle has reached the proper chill temperature. The wrapping operation can then be started by throwing in the clutch for the wrapping machine thus running both it and the ice cream sandwich making mechanism. If the timing is found a little bit off, that is if the ice cream tends to over-fill or under-fill the sandwiches, the speed of the wrapping machine and the ice cream sandwich making mechanism can be changed as desired. The tube 70 is preferably made of a transparent plastic material so as to permit the flow of the ice cream to be seen therethrough, and to provide sufficient flexibility in the line for variation in the relative heights of the ice cream making apparatus and the sandwich making machine.

Although the sandwich making apparatus which I have described in detail is particularly intended for use with ice cream, it is apparent that my invention is equally applicable to any other plastic comestible which would lend itself to this type of sandwich assembly.

Some changes may be made in the construction and arrangement of the parts of my sandwich machine and the steps of my method may to some extent be varied without departing from the real spirit and purpose of my invention, and it is my intention to cover by my claims any modified forms of structure, use of mechanical equivalents or equivalent method step which may be reasonably included within their scope.

I claim as my invention:

1. An improved sandwich separating means for a sandwich making machine of the type including an extrusion nozzle having a discharge end from which a plastic comestible may be continuously extruded, and means for feeding wafers against opposite sides of said nozzle and moving them in the direction the comestible is being extruded; said separating means comprising a conveyor providing a series of separate spaced-apart pockets, said pockets each having an open end for receiving therein a pair of wafers having extruded comestible therebetween, and means operative to intermittently move said conveyor relative to an extrusion nozzle for successively positioning said pockets with their open ends in an oriented filling position closely adjacent an extrusion nozzle for receiving therein a pair of wafers having extruded comestible therebetween, whereby said pockets are adapted after filling and upon movement of a next successive pocket toward said oriented filling position to shear off comestible across the discharge end of a nozzle and thereby deliver successive sandwiches.

2. An improved sandwich separating means for a sandwich making machine of the type including an extrusion nozzle having a discharge end from which a plastic comestible may be continuously extruded, and means for feeding wafers against opposite sides of said nozzle and moving them in the direction the comestible is being extruded; said separating means comprising a pair of spaced discs having notches therein providing a series of separate spaced-apart pockets, said pockets each having an open end for receiving therein a pair of wafers having extruded comestible therebetween and means operative to intermittently move said discs relative to an extrusion nozzle for successively positioning said pockets with their open ends in an oriented filling position closely adjacent an extrusion nozzle for receiving therein a pair of wafers having extruded comestible therebetween, whereby said pockets are adapted after filling and upon movement of a next successive pocket toward said oriented filling position to shear off comestible across the discharge end of a nozzle and thereby deliver successive sandwiches.

3. An improved sandwich separating means for a sandwich making machine of the type including an extrusion nozzle having a discharge end from which a plastic comestible may be continuously extruded, and means for feeding wafers against opposite sides of said nozzle and moving them in the direction the comestible is being extruded; said separating means comprising a pair of spaced discs having notches therein providing a series of separate spaced-apart pockets, said pockets each tapering outwardly toward an open end for receiving therein a pair of wafers having extruded comestible therebetween, and means operative to intermittently move said discs relative to an extrusion nozzle for successively positioning said pockets with their open ends in an oriented filling position closely adjacent an extrusion nozzle for receiving therein a pair of wafers having extruded comestible therebetween, whereby said pockets are adapted after filling and upon movement of a next successive pocket toward said oriented filling position to shear off comestible across the discharge end of a nozzle and thereby deliver successive sandwiches.

4. An improved sandwich separating means for a sandwich making machine of the type including an extrusion nozzle having a discharge end from which a plastic comestible may be continuously extruded, and means for feeding wafers against opposite sides of said nozzle and moving them in the direction the comestible is being extruded; said separating means comprising a rotatably mounted conveyor wheel providing a series of separate spaced-apart pockets, said pockets each having an open end for receiving therein a pair of wafers having extruded comestible therebetween, and means operative to intermittently rotate said conveyor relative to an extrusion nozzle for successively positioning said pockets with their open ends in an oriented filling position closely adjacent an extrusion nozzle for receiving therein a pair of wafers having extruded comestible therebetween, whereby said pockets are adapted after filling and upon movement of a next successive pocket toward said oriented filling position to shear off comestible across the discharge end of a nozzle and thereby deliver successive sandwiches.

5. An improved sandwich separating means for a sandwich making machine of the type including an extrusion nozzle having a discharge end from which a plastic comestible may be continuously extruded, and means for feeding wafers against opposite sides of said nozzle and moving them in the direction the comestible is being extruded; said separating means comprising a rotatably mounted conveyor wheel providing a series of separate circumferentially spaced-apart pockets, said pockets each having a radially outwardly open end for receiving therein a pair of wafers having extruded comestible therebetween, and means operative to intermittently rotate said conveyor relative to an extrusion nozzle for successively positioning said pockets with their open ends in an oriented filling position closely adjacent an extrusion nozzle for receiving therein a pair of wafers having extruded comestible therebetween, whereby said pockets are adapted after filling and upon movement of a next successive pocket toward said oriented filling position to shear off comestible across the discharge end of a nozzle and thereby deliver successive sandwiches.

6. An improved sandwich separating means for a sandwich making machine of the type including an extrusion nozzle having a discharge end from which a plastic comestible may be continuously extruded, and means for feeding wafers against opposite sides of said nozzle and moving them in the direction the comestible is being extruded; said separating means comprising a pair of spaced discs having notches therein providing a series of separate circumferentially spaced-apart pockets, said pockets each tapering radially outwardly toward an open end for receiving therein a pair of wafers having extruded comestible therebetween, and means operative to intermittently move said discs relative to an extrusion nozzle for successively positioning said pockets with their open ends in an oriented filling position closely adjacent an extrusion nozzle for receiving therein a pair of wafers having extruded comestible therebetween, whereby said pockets are adapted after filling and upon movement of a next successive pocket toward said oriented filling position to shear off comestible across the discharge end of a nozzle and thereby deliver successive sandwiches.

References Cited in the file of this patent

UNITED STATES PATENTS

| | | |
|---|---|---|
| 1,755,699 | Loehr | Apr. 22, 1930 |
| 2,136,505 | Hirschson | Nov. 15, 1938 |
| 2,521,213 | Gentry | Sept. 5, 1950 |
| 2,639,677 | Anderson | May 26, 1953 |

FOREIGN PATENTS

| | | |
|---|---|---|
| 291,811 | Germany | May 10, 1916 |